(12) United States Patent
Tiao et al.

(10) Patent No.: US 6,547,422 B2
(45) Date of Patent: Apr. 15, 2003

(54) ILLUMINATING MODULE FOR A DISPLAY APPARATUS

(75) Inventors: Kuo-Tung Tiao, Hsin-Chu (TW); Fu-Ming Chuang, Hsin-Chu Hsien (TW)

(73) Assignee: Prokia Technology Co., Ltd., Tainan Hsien (TW)

( * ) Notice: Subject to any disclaimer, the term of this patent is extended or adjusted under 35 U.S.C. 154(b) by 0 days.

(21) Appl. No.: 09/925,837

(22) Filed: Aug. 8, 2001

(65) Prior Publication Data

US 2003/0031031 A1 Feb. 13, 2003

(51) Int. Cl.$^7$ .................................................. F21V 7/00
(52) U.S. Cl. ........................ 362/298; 362/268; 362/305; 362/31; 362/558
(58) Field of Search .............................. 362/296, 298, 362/302, 303, 305, 268, 560, 31, 558

(56) References Cited

U.S. PATENT DOCUMENTS

| | | | |
|---|---|---|---|
| 5,142,387 A | * | 8/1992 | Shikama et al. ................ 349/5 |
| 5,574,328 A | * | 11/1996 | Okuchi ........................ 313/111 |

* cited by examiner

Primary Examiner—Sandra O'Shea
Assistant Examiner—John Anthony Ward
(74) Attorney, Agent, or Firm—Trop, Pruner & Hu, P.C.

(57) ABSTRACT

An illuminating module includes a first reflector having a curved first reflector surface, a reflector opening and a first focal point, and a light source disposed in the first reflector at the first focal point. A second reflector is mounted on a surrounding edge of the first reflector to configure the opening with shielded and unshielded portions, and has a second reflector surface facing the first reflector surface. A portion of the light rays from the light source which radiates toward the first reflector and which is reflected thereby toward the shielded portion is reflected by the second reflector surface back to the light source so as to be able to combine with the light rays that are reflected by the first reflector for passage through the unshielded portion.

14 Claims, 7 Drawing Sheets

ILLUMINATING MODULE FOR A DISPLAY APPARATUS

BACKGROUND OF THE INVENTION

1. Field of the Invention

The invention relates to an illuminating module for a display apparatus, more particularly to an illuminating module in which light rays from a light source can be outputted with a relatively small area of coverage and with a relatively high intensity.

2. Description of the Related Art

Conventional display apparatuses are used to process light from a light source, and include a number of components for performing light filtration, integration, splitting, modulation, synthesis, etc., for subsequent projection on a display panel so as to form images on the display panel for viewing purposes.

FIG. 1 shows a conventional illuminating module 1 for use in a display apparatus. The illuminating module 1 is shown to include an ellipsoidal reflector 11 with an optical axis and first and second focal points, a light source 12 disposed in the reflector 11 at the first focal point, a light integrator 13 disposed on the optical axis at the second focal point to receive light rays that radiate initially toward a reflector surface of the reflector 11 and that are reflected thereby to converge at the second focal point, a first condenser 14 disposed on the optical axis to receive light rays passing through the light integrator 13, a polarization state converter 15 disposed on the optical axis to convert the polarization state of the light rays that pass through the first condenser 14, and a second condenser 16 disposed on the optical axis to condense the light rays passing through the polarization state converter 15 for projection onto a liquid crystal display panel 17. The light integrator 13 may be a rod integrator that can convert the light rays into evenly distributed light rays. The polarization state converter 15 converts the polarization state of light rays that pass therethrough from P-polarization to S-polarization or from S-polarization to P-polarization in a known manner.

In the conventional illuminating module 1, the light rays from the light source 12 are projected on the display panel 17. Since the light rays from the light source 12 have a certain angle of radiation and cover a certain area in a specific direction, and since the light rays projected on the display panel 17 encompass a certain range, in order to achieve a required image brightness, the display panel 17 has to have a certain size. Under the current trend for compact and light products, the size of the display panel 17 will need to be reduced.

SUMMARY OF THE INVENTION

Therefore, the main object of the present invention is to provide an illuminating module for a display apparatus, which can reduce the area covered by the light rays outputted thereby so as to permit a reduction in the size of the display panel and which can output light with a relatively high intensity.

Accordingly, an illuminating module of the present invention is adapted for use in a display apparatus, and includes a first reflector, a light source, and a second reflector. The first reflector has a reflector axis, a curved first reflector surface that surrounds the reflector axis, a front surrounding edge which defines a reflector opening that opens forwardly, and a first focal point surrounded by the first reflector surface and disposed on the reflector axis. The light source is disposed in the first reflector at the first focal point. The second reflector is mounted on the front surrounding edge to configure the reflector opening with shielded and unshielded portions. The second reflector has a second reflector surface that faces the first reflector surface. A first portion of light rays from the light source radiates toward the first reflector surface and is reflected by the first reflector surface to pass directly through the unshielded portion of the reflector opening and travel along an optical axis. A second portion of the light rays from the light source initially radiates toward the first reflector surface, and is reflected by the first reflector surface toward the shielded portion of the reflector opening so as to be reflected by the second reflector surface back to the light source so that the second portion of the light rays is able to combine with the first portion of the light rays.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
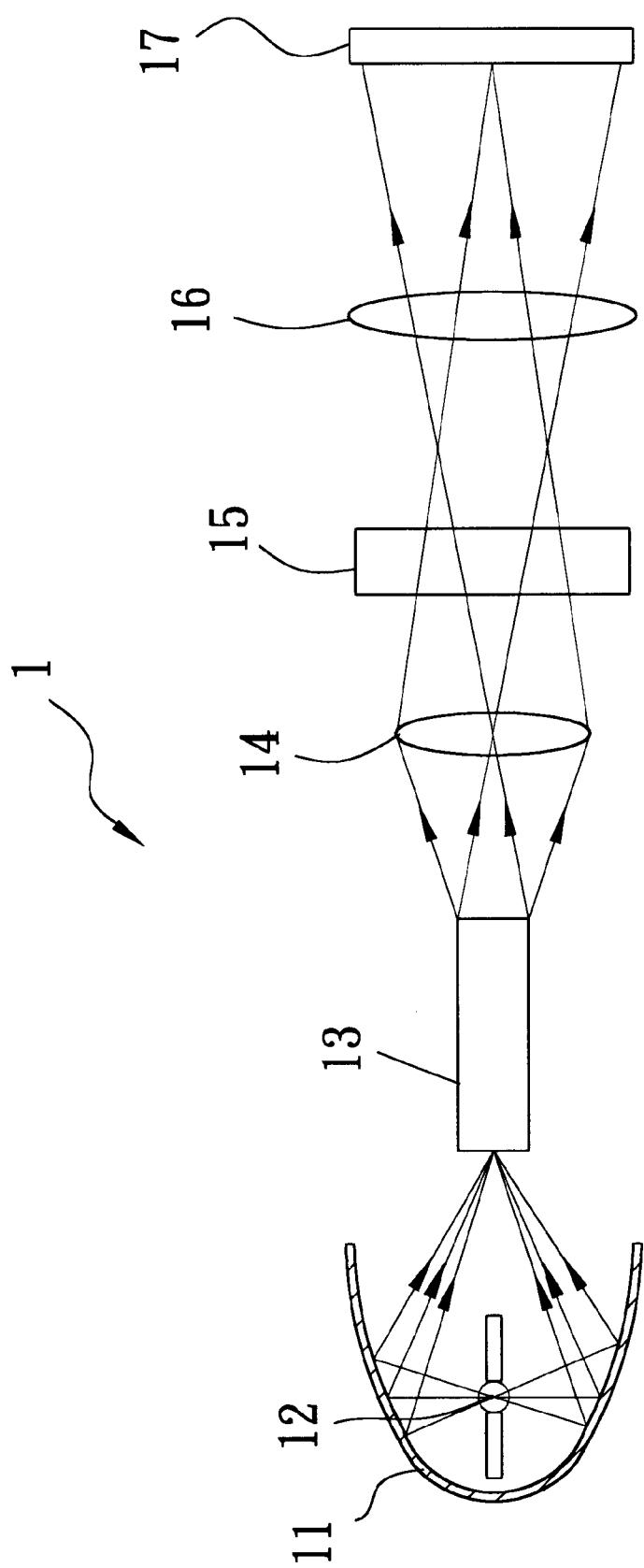
FIG. 1 is a partly sectional schematic view of a conventional illuminating module for a display apparatus.

Before the present invention is described in greater detail, it should be noted that like elements are denoted by the same reference numerals throughout the disclosure.

Figure 2:
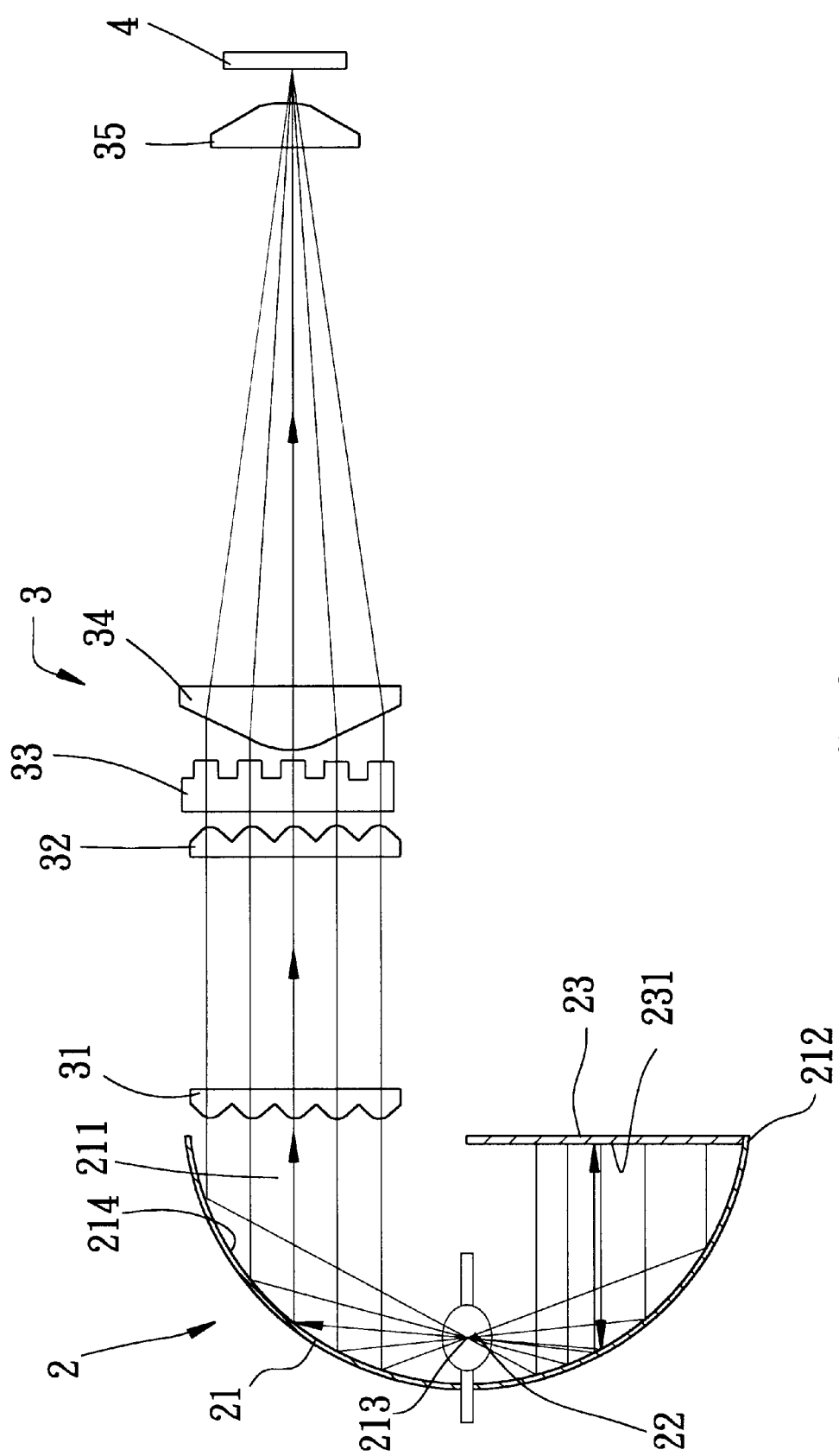
FIG. 2 is a partly sectional schematic view of the first preferred embodiment of an illuminating module according to the present invention.

Referring to FIG. 2, the first preferred embodiment of an illuminating module according to the present invention forms a part of a display apparatus, and is shown to include a reflector assembly 2 and a light processing mechanism 3.

The reflector assembly 2 includes a first reflector 21, a light source 22, and a second reflector 23. The first reflector 21 is in the form of a parabolic reflector having a reflector axis and confining a light receiving space 211 with a circular reflector opening that opens forwardly. The first reflector 21 has a front surrounding edge 212 which defines the reflector opening, a first focal point 213 disposed in the light receiving space 211 on the reflector axis, and a curved first reflector surface 214 that surrounds the reflector axis, the first focal point 213 and the receiving space 211.

The light source 22 is disposed in the first reflector 21 at the first focal point 213. Due to the characteristics of the first reflector surface 214, when the light source 22 is disposed at the first focal point 213, light rays will, after being reflected by the first reflector surface 214, become completely parallel light rays. On the contrary, if parallel light rays are projected on the first reflector surface 214, the light rays will be reflected thereby to converge at and pass through the first focal point 213. In other words, the light rays that face the first reflector surface 214 will radiate toward the first reflector surface 214, and will be subsequently reflected thereby to travel in parallel lines toward the reflector opening of the first reflector 21.

In this embodiment, the second reflector 23 is in the form of an upright semi-circular planar mirror disposed perpendicular to the reflector axis, and is mounted on the front surrounding edge 212 to extend from the front surrounding edge 212 toward the reflector opening so as to configure the reflector opening with shielded and unshielded portions such that the shielded and unshielded portions encompass lower and upper side-halves of the reflector opening, respectively. The second reflector 23 of this embodiment is mounted on the front surrounding edge 212 at the lower side-half of the reflector opening, and has a second reflector surface 231 that faces the first reflector surface 214. As such, a portion of the light rays from the light source 22 that radiates toward a lower half portion of the first reflector surface 214 is reflected by the latter to travel in parallel lines toward the shielded portion of the reflector opening, and is further reflected by the second reflector surface 231 back to the first reflector surface 214 in parallel lines and further back to the light source 22 so as to be able to be directed toward an upper half portion of the first reflector surface 214 and reflected by the first reflector surface 214 to pass directly through the unshielded portion of the reflector opening along an optical axis in parallel lines. In this embodiment, the optical axis is parallel to the reflector axis. Certainly, the second reflector 23 can also be mounted at an upper, left or right side-half of the reflector opening, or any suitable side-half thereof.

The light processing mechanism 3 is disposed on the optical axis, and includes a light integrator set, a polarization state converter 33, and a condenser set. The light integrator set is disposed on the optical axis so as to receive the light rays from the unshielded portion of the reflector opening, and includes first and second integrator lenses 31, 32 that form a lens array integrator. The polarization state converter 33 is disposed on the optical axis between the light integrator set and the condenser set so as to receive the light rays passing through the light integrator set. The condenser set is disposed on the optical axis, and includes first and second condenser lenses 34, 35. The first condenser lens 34 is disposed to receive the light rays passing through the polarization state converter 33. The second condenser lens 35 is disposed to receive the light rays passing through the first condenser lens 34 for subsequent projection onto a display panel 4, which is in the form of a liquid crystal display panel. The first and second integrator lenses 31, 32 serve to integrate and convert the light rays into evenly distributed light rays in the shape of a rectangle that matches the shape of the display panel 4. In use, the first integrator lens 31 that is adjacent to the reflector assembly 2 splits the light rays into a plurality of light blocks for projection on the second integrator lens 32. The second integrator lens 32 is completely registered with the first integrator lens 31 to enhance even distribution of the light rays. The polarization state converter 33 converts the polarization state of light rays that pass therethrough from P-polarization to S-polarization or from S-polarization to P-polarization in a known manner.

The display panel 4 is provided to receive the light rays passing through the second condenser lens 35 so as to display images thereon.

In use, as indicated by the arrows in FIG. 2, the light rays from the light source 22 are reflected by the first reflector 21 to travel in parallel lines toward the reflector opening. At this time, a first portion of the light rays from the light source 22 radiates toward the first reflector surface 214 and is reflected thereby to pass directly through the unshielded portion of the reflector opening and travel along the optical axis in parallel lines, whereas a second portion of the light rays from the light source 22 initially radiates toward the lower half portion of the first reflector surface 214 and is reflected thereby to travel in parallel lines toward the shielded portion of the reflector opening so as to be reflected by the second reflector surface 231 back to the lower portion of the first reflector surface 214 in parallel lines and further back to the light source 22 at the first focal point 213. The second portion of the light rays then radiates toward the upper half portion of the first reflector surface 214 to be reflected thereby so as to travel in parallel lines out of the unshielded portion of the reflector opening. As such, the first and second portions of the light rays from the light source 22 can be combined for propagation through the unshielded portion of the reflector opening. The light rays outputted by the reflector assembly 2 pass through the light processing mechanism 3 for processing by the first and second integrator lenses 31, 32, the polarization state converter 33, and the first and second condenser lenses 34, 35, so as to converge on the display panel 4.

Figure 3:
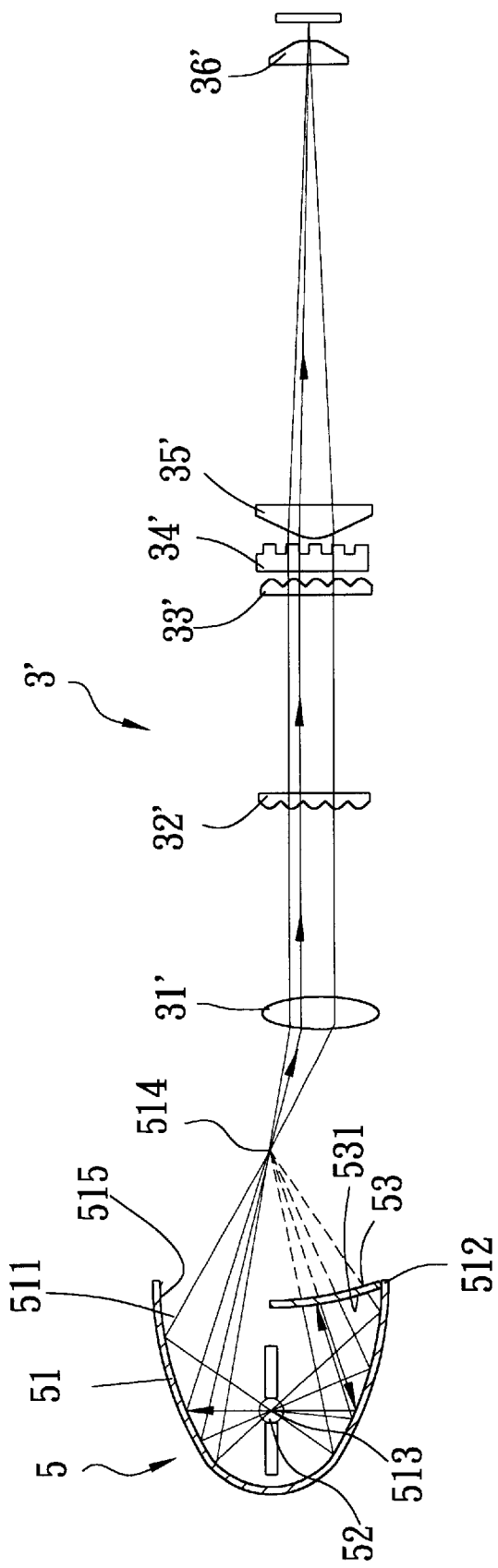
FIG. 3 is a partly sectional schematic view of the second preferred embodiment of an illuminating module according to the present invention.

Referring to FIG. 3, the second preferred embodiment of an illuminating module according to the present invention is shown to include a reflector assembly 5 and a light processing mechanism 3'. The main difference between this embodiment and the previous embodiment resides in that the reflector assembly 5 has a different construction, and the processing mechanism 3' includes an additional lens unit.

The reflector assembly 5 includes a first reflector 51, a light source 52, and a second reflector 53. The first reflector 51 is in the form of an ellipsoidal reflector having a reflector axis and confining a light receiving space 511 with a circular reflector opening that opens forwardly. The first reflector 51 has a front surrounding edge 512 which defines the first reflector opening, a first focal point 513 disposed in the light receiving space 511 on the reflector axis, a second focal point 514 aligned with the reflector axis and disposed outside of the light receiving space 511, and a curved first reflector surface 515 that surrounds the reflector axis, the first focal point 513 and the receiving space 511.

In this embodiment, the light source 52 is disposed at the first focal point 513 of the first reflector 51 and radiates light rays in radial directions. Due to the characteristics of the first reflector surface 515, when the light source 52 is disposed at the first focal point 513, the light rays that radiate toward the first reflector surface 515 will be reflected thereby to converge at the second focal point 514. The second reflector 53 of this embodiment is an upright spherical reflector that is disposed perpendicular to the reflector axis and that extends from the front surrounding edge 512 toward the reflector opening so as to configure the reflector opening with shielded and unshielded portions that encompass lower and upper side-halves of the reflector opening, respectively. The second reflector 53 has a third focal point that is coincident with the second focal point 514. In this embodiment, the second reflector 53 is mounted on the front surrounding edge 512 at a lower side-half of the reflector opening, and has a curved second reflector surface 531 facing the light receiving space 511. The second reflector surface 531 is disposed so that a portion of the light rays which radiates from the light source 52 toward a lower half portion of the first reflector surface 515 can be reflected thereby to the second reflector surface 531, which then reflects the same back to the first reflector surface 515 along the original optical path for subsequent reflection back to the light source 52 at the first focal point 513 so as to radiate toward an upper half portion of the first reflector surface 515 for propagation through the unshielded portion of the reflector opening along an optical axis, which is parallel to the reflector axis. Certainly, the second reflector 53 can be arranged to be mounted on the front surrounding edge 512 at the upper, left, or right side-half of the reflector opening, or any suitable side-half thereof.

The light processing mechanism 3' is disposed on the optical axis and likewise includes a light integrator set comprising first and second integrator lenses 32', 33' that form a lens array integrators, a polarization state converter 34', and a condenser set comprising first and second condenser lenses 35', 36'. The light processing mechanism 3' further includes a condenser lens unit 31', which is disposed on the optical axis between the second focal point 514 and the first integrator lens 32' to convert the light rays that diverge at the second focal point 514 into parallel light rays.

Figure 4:
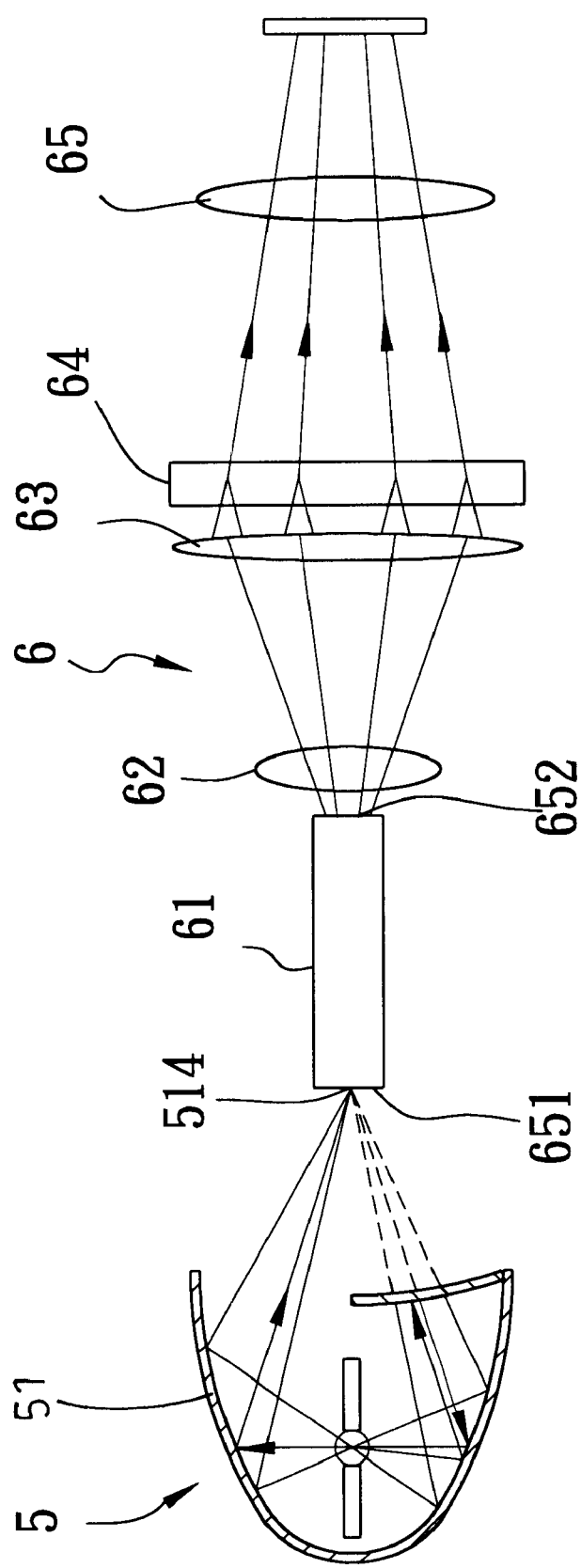
FIG. 4 is a partly sectional schematic view of the third preferred embodiment of an illuminating module according to the present invention.

Referring to FIG. 4, the third preferred embodiment of an illuminating module according to the present invention is shown to include a reflector assembly 5 and a light processing mechanism 6. The main difference between this embodiment and the second preferred embodiment resides in the construction of the light processing mechanism 6. In this embodiment, the light processing mechanism 6 includes a light integrator 61, a polarization state converter 64 and a condenser set. The light integrator 61 is disposed on the optical axis so as to convert light rays from the reflector assembly 5 into evenly distributed light rays. The condenser set is disposed on the optical axis, and includes a first condenser lens 62 for receiving the light rays passing through the light integrator 61, a second condenser lens 63 for receiving the light rays passing through the first condenser lens 62, and a third condenser lens 65 for receiving the light rays passing through the polarization state converter 64. The polarization state converter 64 is disposed on the optical axis between the second and third condenser lenses 63, 65 so as to receive and polarize the light rays passing through the first and second condenser lenses 62, 63. In this embodiment, the light integrator 61 is in the form of a glass rod integrator or a hollow pipe with an inner wall surface plated with a reflective film, and has an input side 651 and an output side 652. The input side 651 is coincident with the second focal point 514 of the first reflector 51. All of the light rays that converge at the input side 651 are outputted via the output side 652. Due to the distribution of the incidental angles of the light rays, there occur different numbers of internal reflections of the light rays within the light integrator 61, which, combined with the reflections from all sides of the light integrator 61, can produce a virtual light array with uniform light diffusion like a kaleidoscopic phenomenon can be produced for outputting evenly distributed light rays from the output side 652.

Figure 5:
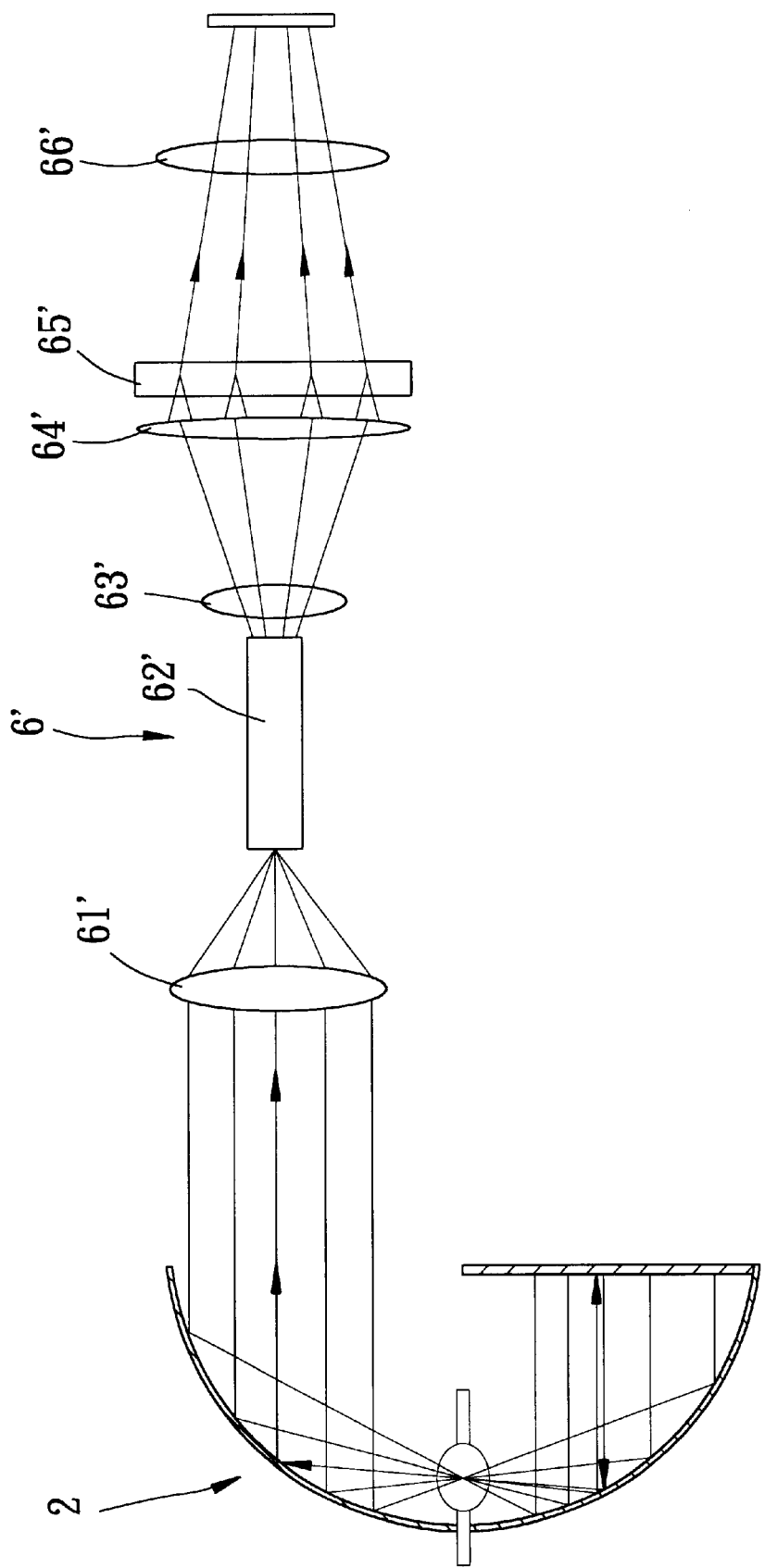
FIG. 5 is a partly sectional schematic view of the fourth preferred embodiment of an illuminating module according to the present invention.

Referring to FIG. 5, the fourth preferred embodiment of an illuminating module according to the present invention is shown to include a reflector assembly 2 and a light processing mechanism 6'. The main difference between this embodiment and the first preferred embodiment resides in the construction of the light processing mechanism 6'. The light processing mechanism 6' is substantially the same in construction as the light processing mechanism 6 of the third preferred embodiment, but further includes a lens unit. In this embodiment, the light processing mechanism 6' includes a condenser lens unit 61' disposed on the optical axis so as to receive parallel light rays from the reflector assembly 2 and converge the same at a focal point, a light integrator 62' in the form of a rod integrator with an input side that is coincident with the focal point of the condenser lens unit 61', a first condenser lens 63', a second condenser lens 64, a polarization state converter 65', and a third condenser lens 66'.

Figure 6:
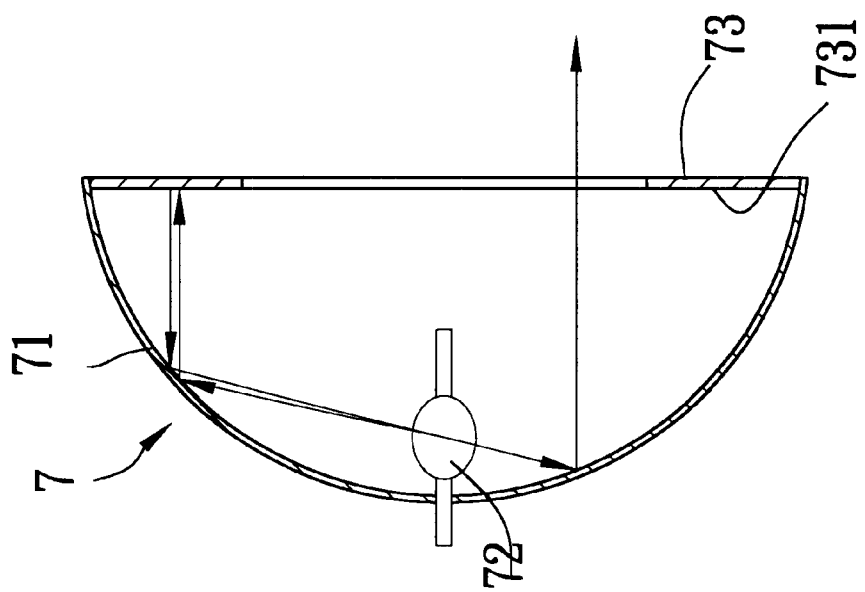
FIG. 6 is a schematic sectional view of a reflector assembly according to the fifth preferred embodiment of an illuminating module of the present invention.

FIG. 6 illustrates a reflector assembly 7 according to the fifth preferred embodiment of an illuminating module of the present invention. The reflector assembly 7 includes a parabolic first reflector 71 having a forward opening and a reflector axis, a light source 72 disposed in the first reflector 71 at a focal point thereof, and a second reflector 73. In this embodiment, the second reflector 73 is disposed to extend radially and inwardly from a front surrounding edge of the first reflector 71 in the direction of the reflector axis, and is in the form of an upright annular mirror surrounding the reflector axis so as to configure the reflector opening with annular shielded and circular unshielded portions such that the circular unshielded portion is surrounded by the annular shielded portion and such that the reflector axis is aligned with the optical axis. The second reflector 73 has a second reflector surface 731 facing the first reflector surface of the first reflector 71 such that, in use, a portion of the light rays from the light source 72 will pass directly through the reflector opening, whereas a portion of the light rays will radiate toward the first reflector surface and be reflected thereby to travel in parallel lines through the unshielded portion of the reflector opening or toward the shielded portion of the reflector opening so as to be reflected by the second reflector surface 731 in the latter case back to the first reflector surface along the original optical path for subsequent reflection to the focal point so as to be able to pass through the circular unshielded portion of the reflector opening along parallel lines.

Figure 7:
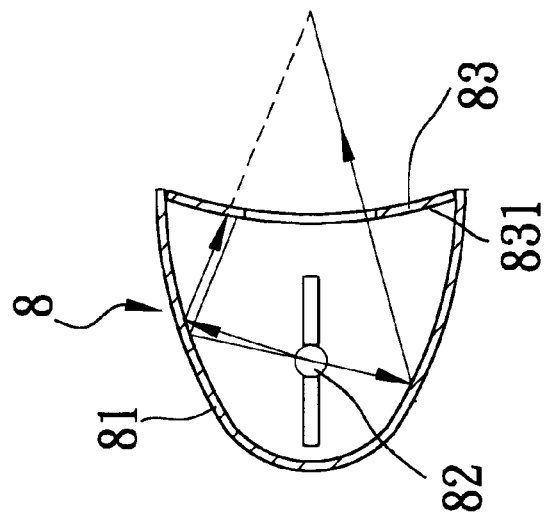
FIG. 7 is a schematic sectional view of a reflector assembly according to the sixth preferred embodiment of an illuminating module of the present invention.

FIG. 7 shows a reflector assembly 8 according to the sixth preferred embodiment of an illuminating module of the present invention. The reflector assembly 8 includes an ellipsoidal first reflector 81 with a forward reflector opening and having a first focal point disposed on a reflector axis and surrounded by a first reflector surface and a second focal point disposed outside of the first reflector 81, a light source 82 disposed in the first reflector 81 at the first focal point thereof, and an annular spherical second reflector 83 with a third focal point that is coincident with the second focal point. The second reflector 83 is disposed to extend radially inward from a front surrounding edge of the first reflector 81 in the direction of the reflector axis so as to configure the reflector opening with an annular shielded portion and a circular unshielded portion surrounded by the shielded portion, and has a curved second reflector surface 831 that faces the first reflector surface of the first reflector 81. In use, a portion of the light rays which is reflected toward the shielded portion of the reflector opening is reflected by the second reflector surface 831 back to the light source 82 so as to be able to be reflected by the first reflector surface to travel through the unshielded portion of the reflector opening.

Figure 8:
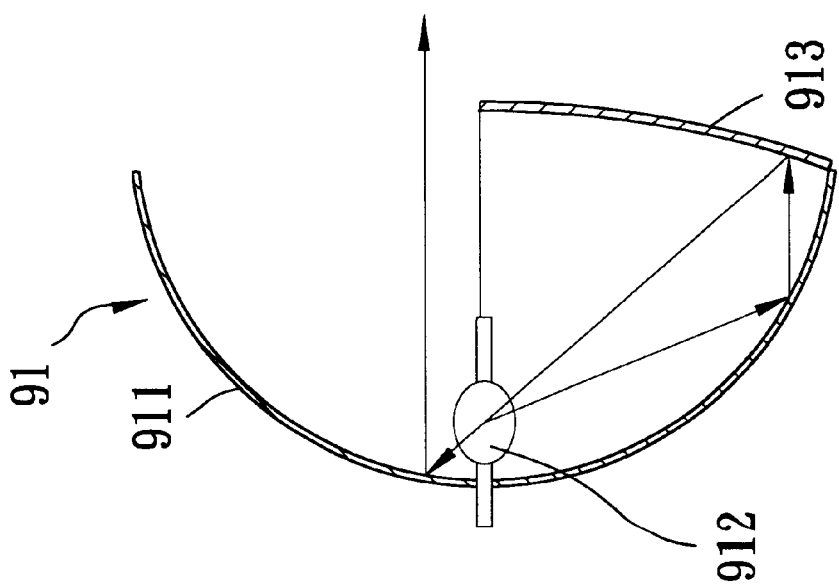
FIG. 8 is a schematic sectional view of a reflector assembly according to the seventh preferred embodiment of an illuminating module of the present invention.

FIG. 8 shows a reflector assembly 91 of the seventh preferred embodiment of an illuminating module of the present invention. The reflector assembly 91 includes a parabolic first reflector 911 with a first focal point and a forward reflector opening, a light source 912 disposed in the first reflector 911 at the first focal point, and a parabolic second reflector 913 with a second focal point coincident with the first focal point. The second reflector 913 is disposed to extend from a front surrounding edge of the first reflector 911 so as to configure the reflector opening with shielded and unshielded portions that encompass two side-halves of the reflector opening, respectively. In use, a portion of the light rays from the light source 912 will be reflected to the shielded portion of the reflector opening in parallel lines and will be reflected by the second reflector 913 back to the light source 912 so as to be able to be reflected by the first reflector 911 through the unshielded portion of the reflector opening in parallel lines.

Figure 9:
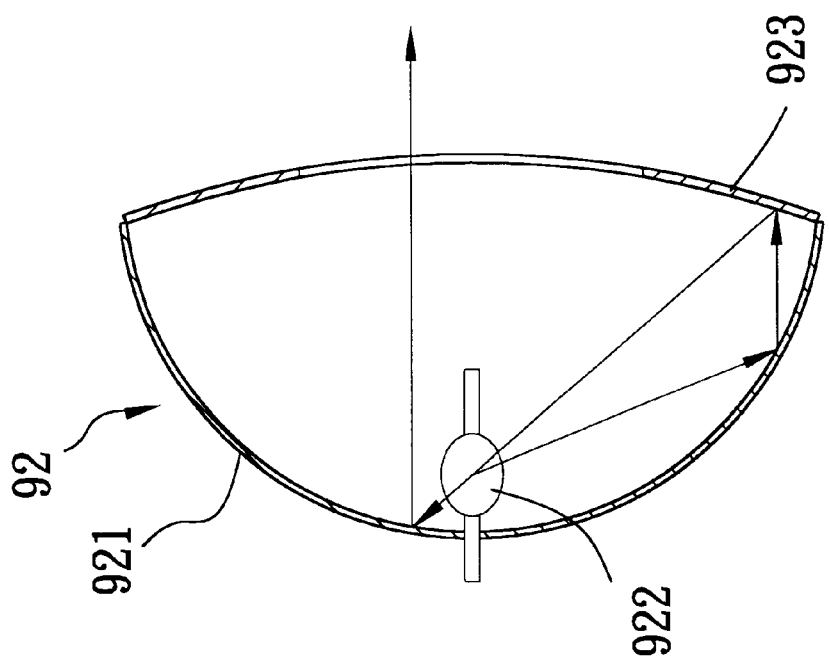
FIG. 9 is a schematic sectional view of a reflector assembly according to the eighth preferred embodiment of an illuminating module of the present invention.

FIG. 9 shows a reflector assembly 92 according to the eighth preferred embodiment of an illuminating module of the present invention. The reflector assembly 92 includes a parabolic first reflector 921 with a first focal point and a forward reflector opening, a light source 922 disposed in the first reflector 921 at the first focal point, and a parabolic second reflector 923 with a second focal point coincident with the first focal point. The second reflector 923 is annular in shape and is disposed to extend radially inward from a front surrounding edge of the first reflector 921 so as to configure the reflector opening with an annular shielded portion and a circular unshielded portion surrounded by the shielded portion. In use, a portion of the light rays from the light source 922 will be reflected by the first reflector 921 to the shielded portion of the reflector opening in parallel lines and will be reflected by the second reflector 923 back to the light source 922 so as to be able to be reflected by the first reflector 921 through the unshielded portion of the reflector opening in parallel lines.

In the present invention, a second reflector is utilized to shield a portion of the opening of a first reflector so as to reflect a portion of the light rays from the light source back to the first reflector for projection through the unshielded portion of the opening, thereby reducing the area covered by the light rays emitted from the first reflector and to be converged on a display panel to permit manufacture of relatively compact products. In addition, since the light rays from the light source can be combined for propagation, a large portion of the light energy can be effectively utilized so as to enhance the intensity and brightness of the light projected on the display panel, thereby resulting in enhanced image quality and resolution.

In sum, the present invention provides an illuminating module, in which the light rays radiating from the light source can be combined for propagation such that the area covered by the combined light rays is reduced. As a result, the sizes of the display panel and other relevant components can be reduced to meet the current trend for compact products. Besides, the brightness of the images can be enhanced.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An illuminating module for a display apparatus, said illuminating module comprising:
    a first reflector having a reflector axis, a curved first reflector surface that surrounds said reflector axis, a front surrounding edge which defines a reflector opening that opens forwardly, and a first focal point surrounded by said first reflector surface and disposed on said reflector axis;
    a light source disposed in said first reflector at said first focal point;
    a second reflector mounted on said front surrounding edge to configure said reflector opening with shielded and unshielded portions, said second reflector having a second reflector surface that faces said first reflector surface, wherein a first portion of light rays from said light source radiates toward said first reflector surface and is reflected by said first reflector surface to pass directly through said unshielded portion of said reflector opening and travel along an optical axis, and wherein a second portion of the light rays from said light source initially radiates toward said first reflector surface and is reflected by said first reflector surface toward said shielded portion of said reflector opening so as to be reflected by said second reflector surface back to said light source so that the second portion of the light rays is able to combine with the first portion of the light rays;
    a light integrator disposed on said optical axis so as to receive the light rays from said unshielded portion of said reflector opening;
    a polarization state converter disposed on said optical axis so as to receive the light rays passing through said light integrator; and
    a condenser disposed on said optical axis so as to receive the light rays passing through said polarization state converter.

2. The illuminating module of claim 1, wherein said first reflector is a parabolic reflector, and said second reflector is a planar mirror.

3. The illuminating module of claim 2, wherein said second reflector is semi-circular in shape and extends from said front surrounding edge such that said shielded and unshielded portions encompass two side-halves of said reflector opening, respectively.

4. The illuminating module of claim 2, wherein said second reflector is annular in shape such that said unshielded portion is surrounded by said shielded portion and such that said reflector axis is aligned with said optical axis.

5. The illuminating module of claim 1, wherein said first reflector is a parabolic reflector, and said second reflector is a parabolic reflector having a second focal point that is coincident with said first focal point.

6. The illuminating module of claim 5, wherein said second reflector extends from said front surrounding edge such that said shielded and unshielded portions encompass two side-halves of said reflector opening, respectively.

7. The illuminating module of claim 5, wherein said second reflector is annular in shape such that said unshielded portion is surrounded by said shielded portion and such that said reflector axis is aligned with said optical axis.

8. The illuminating module of claim 1, wherein said first reflector is an ellipsoidal reflector with a second focal point, and said second reflector is a spherical reflector having a third focal point that is coincident with said second focal point.

9. The illuminating module of claim 8, wherein said second reflector extends from said front surrounding edge such that said shielded and unshielded portions encompass two side-halves of said reflector opening, respectively.

10. The illuminating module of claim 8, wherein said second reflector is annular in shape such that said unshielded portion is surrounded by said shielded portion.

11. The illuminating module of claim 1, wherein said light integrator is a lens array integrator.

12. The illuminating module of claim 1, wherein said light integrator is a rod integrator.

13. The illuminating module of claim 1, further comprising a lens unit disposed on said optical axis between said unshielded portion of said reflector opening and said light integrator.

14. The illuminating module of claim 1, further comprising a second condenser disposed on said optical axis between said light integrator and said polarization state converter.

* * * * *